United States Patent
Nakura et al.

(10) Patent No.: US 9,411,292 B2
(45) Date of Patent: Aug. 9, 2016

(54) IMAGE FORMING APPARATUS, IMAGE FORMING METHOD, AND COMPUTER-READABLE RECORDING MEDIUM

(71) Applicants: Makoto Nakura, Ibaraki (JP); Naoto Ueda, Ibaraki (JP); Satoshi Ueda, Ibaraki (JP); Shingo Takai, Ibaraki (JP); Koichi Kudo, Kanagawa (JP)

(72) Inventors: Makoto Nakura, Ibaraki (JP); Naoto Ueda, Ibaraki (JP); Satoshi Ueda, Ibaraki (JP); Shingo Takai, Ibaraki (JP); Koichi Kudo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 37 days.

(21) Appl. No.: 13/950,978

(22) Filed: Jul. 25, 2013

(65) Prior Publication Data
US 2014/0037299 A1  Feb. 6, 2014

(30) Foreign Application Priority Data

Jul. 31, 2012 (JP) ................................. 2012-170448
Sep. 24, 2012 (JP) ................................. 2012-209244
Mar. 29, 2013 (JP) ................................. 2013-073916

(51) Int. Cl.
*G06F 3/12* (2006.01)
*G06F 15/00* (2006.01)
(Continued)

(52) U.S. Cl.
CPC ............ *G03G 15/607* (2013.01); *G03G 15/235* (2013.01); *G03G 15/5095* (2013.01);
(Continued)

(58) Field of Classification Search
CPC ............ B41J 21/00; B65H 5/06; B65H 85/00
USPC ........... 399/82, 28, 16, 197, 85; 358/1.9, 1.15
See application file for complete search history.

(56) References Cited

U.S. PATENT DOCUMENTS 4,864,365 A * 9/1989 Ito ...................... G03G 15/5012
399/28
6,462,838 B1 * 10/2002 Hirata .................... G06K 15/00
358/3.05

(Continued)

FOREIGN PATENT DOCUMENTS

EP       1 292 115 A2    3/2003
JP       04-288560       10/1992

(Continued)

OTHER PUBLICATIONS

Extended European search report dated Sep. 12, 2013.

(Continued)

*Primary Examiner* — Akwasi M Sarpong
(74) *Attorney, Agent, or Firm* — IPUSA, PLLC

(57) ABSTRACT

An image forming apparatus includes an image forming unit forming an image on a first recording medium based on image data, a measurement unit being positioned in an immediate vicinity of the image forming unit, being arranged upstream of a sheet-conveyance path than the image forming unit, and measuring a size of the first recording medium, an expansion ratio calculation unit calculating an expansion ratio of the first recording medium based on a first size of the first recording medium obtained before the first recording medium is passed through the image forming unit and a second size of the first recording medium obtained after the first recording medium is passed through the image forming unit, and a correction unit correcting the image data used for forming another image on a second recording medium conveyed after the first recording medium based on the expansion ratio.

15 Claims, 10 Drawing Sheets

(51) Int. Cl.
*G06K 15/02* (2006.01)
*B41C 1/02* (2006.01)
*H04N 1/405* (2006.01)
*G03G 15/00* (2006.01)
*G03G 15/23* (2006.01)
*H04N 1/00* (2006.01)
*H04N 1/393* (2006.01)

(52) U.S. Cl.
CPC ......... *H04N1/0005* (2013.01); *H04N 1/00034* (2013.01); *H04N 1/00047* (2013.01); *H04N 1/00063* (2013.01); *H04N 1/00087* (2013.01); *H04N 1/00713* (2013.01); *H04N 1/00732* (2013.01); *H04N 1/00734* (2013.01); *H04N 1/00745* (2013.01); *H04N 1/00779* (2013.01); *H04N 1/00793* (2013.01); *H04N 1/393* (2013.01); *H04N 2201/0082* (2013.01)

(56) References Cited

U.S. PATENT DOCUMENTS

| | | | |
|---|---|---|---|
| 7,062,217 | B2 | 6/2006 | Tsukamoto et al. |
| 2004/0190927 | A1* | 9/2004 | Tsukamoto ........ G03G 15/5095 399/82 |
| 2007/0025788 | A1 | 2/2007 | deJong et al. |
| 2012/0141147 | A1* | 6/2012 | Furuya ............... G03G 15/6529 399/16 |
| 2012/0176460 | A1* | 7/2012 | Mochizuki ............. B41J 2/0057 347/213 |

FOREIGN PATENT DOCUMENTS

| | | |
|---|---|---|
| JP | 10-149057 | 6/1998 |
| JP | 2003-241610 | 8/2003 |
| JP | 2004-129069 | 4/2004 |
| JP | 2005-112543 | 4/2005 |
| JP | 2005-250333 | 9/2005 |
| JP | 2005-274950 | 10/2005 |
| JP | 2007-072094 | 3/2007 |
| JP | 2007-079262 | 3/2007 |
| JP | 2007-316140 | 12/2007 |
| JP | 2008110875 A * | 5/2008 |
| JP | 4111026 | 7/2008 |
| JP | 4227367 | 2/2009 |
| JP | 2013-053004 | 3/2013 |

OTHER PUBLICATIONS

European Official Communication dated Dec. 10, 2015.

* cited by examiner

IMAGE FORMING APPARATUS, IMAGE FORMING METHOD, AND COMPUTER-READABLE RECORDING MEDIUM

BACKGROUND OF THE INVENTION

1. Field of the Invention

The present invention relates to an image forming apparatus, an image forming method, and a computer-readable recording medium.

2. Description of the Related Art

In the field of commercial printing, the method for performing, for example, small lot printing, multi-variety printing, and variable data printing is shifting from the conventional method of using an offset printing machine to a POD (Print On Demand) method using an electrophotographic type image forming apparatus. In order to fulfill various needs, there is a demand for the electrophotographic type image forming apparatus to provide performance (e.g., precision in front/back orientation, consistency of image formation) equivalent to that of the offset printing machine.

The factors causing front/back registration slur in the image forming apparatus can be categorized into i) registration error in a vertical direction/horizontal direction, ii) skew error between a recording medium and a printed image, and iii) expansion/shrinkage of an image (increase/decrease of image length) when transferring the image. Further, in a case where an image forming apparatus includes a fixing apparatus, the heat applied from the fixing apparatus to a recording medium may cause the expansion/shrinkage of the recording medium. As a result, the expansion/shrinkage of the recording medium may cause image magnification error and lead to front/back disorientation.

In view of the above, there are methods for reducing magnification error of the front and back sides of a recording medium by calculating image magnification of the front and back sides of a recording medium based on expansion/shrinkage amounts of the recording medium before/after performing a fixing process on the recording medium and correcting image data according to the expansion/shrinkage amounts of the recording medium (see, for example, Japanese Patent No. 4227367, Japanese Laid-Open Patent Publication No. 2004-129069, and Japanese Patent No. 4111026).

However, with the conventional methods for correcting image magnification, after an image is printed on a front side of a recording medium, it is necessary to calculate expansion/shrinkage amounts of a recording medium before/after performing a fixing process and perform magnification correction for an image to be printed on the back side of the recording medium before the image to be printed on the back side of the recording medium is formed on a photoconductor drum or the like.

With a typical image forming apparatus, a certain amount of time is required until an image is transferred to a recording medium. That is, an image is transferred to a recording medium by forming an electrostatic latent image on a photoconductor drum, developing the electrostatic latent image into a toner image by using a development apparatus, and rotating the toner image together with the photoconductor drum. In order to utilize the results of measuring the expansion/shrinkage amount of the recording medium to an image forming process, a measuring unit for measuring the expansion/shrinkage amount of the recording medium is needed to be sufficiently separated from an area of a recording medium conveyance path at which a toner image is transferred to the recording medium.

However, after the recording medium has been shrunk by the heat of the fixing apparatus of the image forming apparatus, the recording medium changes shape in a recovering direction. Therefore, the size of the recording medium changes from the time of passing the measuring unit and the time when a toner image is transferred to the recording medium. Accordingly, it is difficult to perform high precision magnification correction on an image to be printed on a recording medium.

In view of the above, it is possible to stop conveying a recording medium after measuring the length of the recording medium (expansion/shrinkage amount of the recording medium) immediately before transferring a toner image on the recording medium, so that the toner image can be formed in accordance with the measured expansion/shrinkage amount. However, this method may degrade productivity of the image forming apparatus.

SUMMARY OF THE INVENTION

The present invention may provide an image forming apparatus, an image forming method, and a computer-readable recording medium that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus, an image forming method, and a computer-readable recording medium particularly pointed out in the specification in such full, clear, concise, and exact terms as to enable a person having ordinary skill in the art to practice the invention.

To achieve these and other advantages, and in accordance with the purpose of the invention as embodied and broadly described herein, an embodiment of the present invention provides an image forming apparatus including an image forming unit configured to form an image on a first recording medium based on image data, a measurement unit positioned in an immediate vicinity of the image forming unit, arranged upstream of a sheet-conveyance path than the image forming unit, and configured to measure a size of the first recording medium, an expansion ratio calculation unit configured to calculate an expansion ratio of the first recording medium based on a first size of the first recording medium obtained before the first recording medium is passed through the image forming unit and a second size of the first recording medium obtained after the first recording medium is passed through the image forming unit, and a correction unit configured to correct the image data that is used for forming another image on a second recording medium conveyed after the first recording medium based on the expansion ratio of the first recording medium.

Other objects, features and advantages of the present invention will become more apparent from the following detailed description when read in conjunction with the accompanying drawings.

DETAILED DESCRIPTION OF THE PREFERRED EMBODIMENTS

Figure 1:
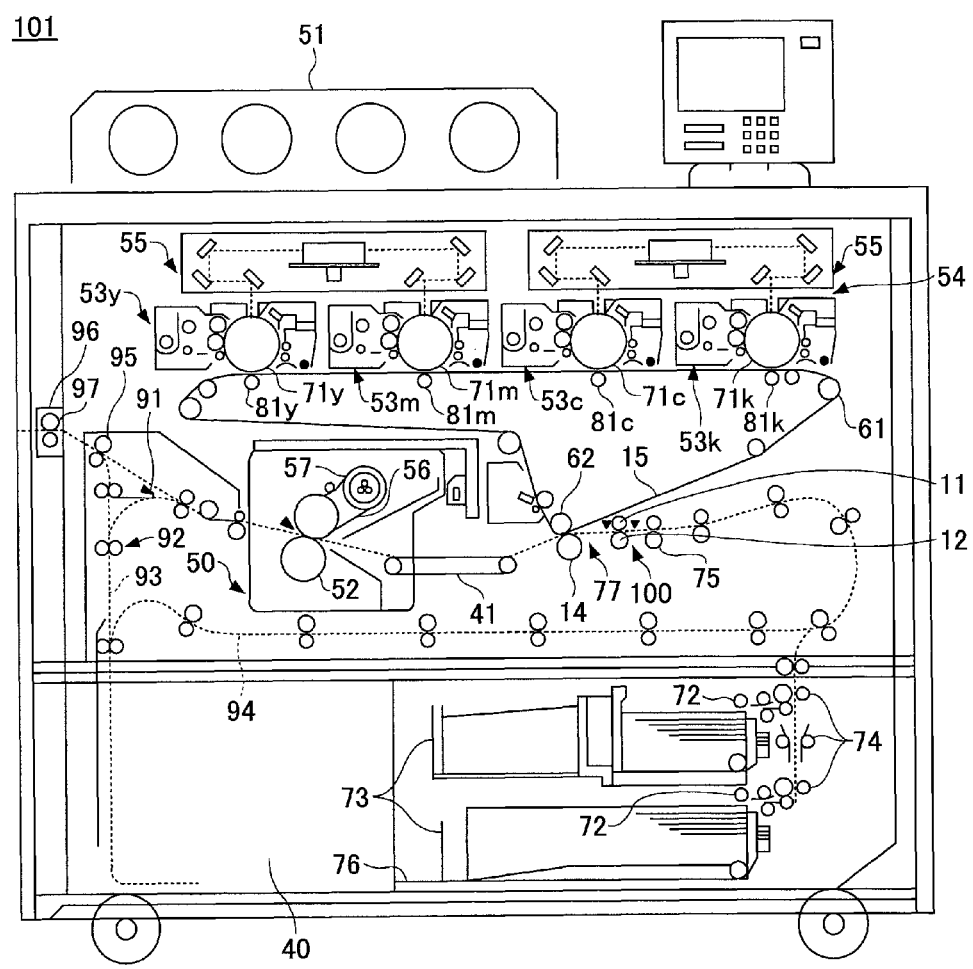
FIG. 1 is a schematic diagram illustrating an example of a configuration of an image forming apparatus according to an embodiment of the present invention.

Embodiments of the present invention are described with reference to the accompanying drawings. It is to be noted that like components/parts may be denoted with like reference numerals and further explanation of the like components/parts may be omitted.

<Configuration of Image Forming Apparatus>

FIG. 1 is a schematic diagram illustrating an example of a configuration of an image forming apparatus 101 according to an embodiment of the present invention.

The image forming apparatus 101 includes an image forming unit constituted by, for example, a tandem image forming device 54, an intermediate transfer belt 15, a secondary transfer device 77, and a fixing device 50. The image forming unit forms an image on a sheet S serving as a recording medium. The sheet S may be, for example, a sheet of paper, or a sheet of OHP (Over Head Projector) paper.

The intermediate transfer belt 15 is provided at a center area of the image forming apparatus 101. The intermediate transfer belt 15 is wound around multiple rollers to be rotated in a clockwise direction in FIG. 1. The intermediate transfer belt 15 rotates in conformity with the rotation of a roller 61.

The tandem image forming apparatus 54 includes multiple development devices 53 (53c, 53m, 53y, 53k) arranged along a sheet conveying direction of the intermediate transfer belt 15. An exposing device 55 is provided at an upper part of the tandem image forming apparatus 54. Each of the development devices 53 of the tandem image forming device 54 includes a photoconductor drum 71 (71c, 71m, 71y, 71k) that corresponds to a color of a toner image to be formed on the photoconductor drum 71. The photoconductor drum 71 serves as an image carrier on which a toner image is carried.

Multiple primary transfer rollers 81 (81c, 81m, 81y, 81k) are arranged in a manner facing corresponding photoconductor drums 71 interposed by the intermediate transfer belt 15. Each primary transfer roller 81 is provided at a primary transfer position at which a toner image is transferred from the photoconductor drum 71 to the intermediate transfer belt 15.

The secondary transfer device 77 is provided on an opposite side with respect to the tandem image forming device 54 interposed by the intermediate transfer belt 15. That is, the secondary transfer device 77 is located on a downstream side of the sheet conveying direction of the intermediate transfer belt 15. The secondary transfer device 77 transfers an image (toner image) on the intermediate transfer belt 15 to the sheet S by pressing a secondary transfer roller 14 to a roller (secondary transfer counter roller) 62 and applying an electric field (transfer electric field) to the roller 62. The secondary transfer device 77 may change a parameter of a transfer condition such as an electric current (transfer current) of the secondary transfer roller 14 in accordance with, for example, the type of the sheet S.

The image forming apparatus 101 also includes a sheet-conveying device 100. The sheet-conveying device 100 is an example of a measuring unit that measures the size of the sheet S. By using the below-described methods and configurations, the sheet-conveying device 100 measures, for example, a distance in which the sheet S is conveyed (sheet conveyance distance), a length of the sheet S (dimension of the sheet S in the sheet-conveying direction), and a width of the sheet S (dimension of the sheet S in a direction orthogonal to the sheet-conveying direction).

The fixing device 50 includes a halogen lamp 57 that is used as a heat source. The fixing device 50 also has a pressure roller 52 pressed against a fixing belt 56. The fixing belt 56 is an endless belt. The fixing device 50 may change a parameter of a fixing condition (e.g., a temperature of the fixing belt 56, a temperature of the pressure roller 52, a nipping width between the fixing belt 56 and the pressure roller 52, or a speed of the pressure roller 52) in correspondence with, for example, the sheet S. After the image is transferred to the sheet S, a conveying belt 41 conveys the sheet S from the secondary transfer 77 to the fixing device 50.

In a case where image data is sent to the image forming apparatus 101 and the image forming apparatus 101 receives an operation start signal, the intermediate transfer belt 15 is rotated by rotating the roller 61 with a drive motor (not illustrated) to rotate other rollers in correspondence with the rotation of the roller 61. Substantially at the same time of the rotation of the intermediate transfer belt 15, each of the development devices 53 forms a single color image on a corresponding photoconductor drum 71. Then, the images formed in the development device 53 are sequentially transferred to the rotating intermediate transfer belt 15 in a superposed manner. Thereby, a composite color image is formed on the intermediate transfer belt 15.

The sheet S is extracted from one of multiple sheet feed cassettes 73 by selectively rotating one of multiple sheet feed rollers 72 of a sheet feed table 76. Then, the sheet S is conveyed by a conveying roller 74 and stops when abutting a registration roller 75. The registration roller 75 is an example of a registration unit. The registration roller 75 corrects a conveyance position of the sheet S and conveys the sheet S by rotating. The registration roller 75 begins to rotate in correspondence with a timing in which the composite color image formed on the intermediate transfer belt 15 reaches the secondary transfer device 77. Then, the secondary transfer device 77 conveys the sheet S, so that the composite color image formed on the intermediate transfer belt 15 is transferred to a front side of the sheet S.

After the composite color image is transferred to the front side of the sheet S, the conveying belt 41 conveys the sheet S to the fixing device 50. The fixing device 50 fixes the image transferred on the sheet S by causing the transferred image to melt by applying heat and pressure to the sheet S. When performing double-side printing on the sheet S in a state where the image is fixed to the front side of the sheet S, the sheet S is conveyed to a sheet inverting path 93 and flipped (inverted) by a branch claw 91 and a flipping roller 92. After the sheet S is conveyed to the sheet inverting path 93 and becomes inverted, the sheet S is conveyed backward (switchback) to a double-side conveyance path 94 by way of, for example, a branch claw (not illustrated) and a pair of rollers (not illustrated), so that a composite color image can be formed on a back side of the sheet S.

Further, in a case of flipping the sheet S and discharging the sheet S in a flipped (inverted) state, the branch claw 91 guides the sheet S to the sheet inverting path 93 to be flipped and discharged from the image forming apparatus 101. In a case of printing only on one side of the sheet S or discharging the sheet S without flipping the sheet S, the sheet S is conveyed to a sheet discharge roller 95 via the branch claw 91.

Then, the sheet discharge roller 95 conveys the sheet S to a decurler unit 96. In the decurler unit 96, a decurl amount (i.e. the amount in which the sheet S is to be decurled) can be adjusted in correspondence with the sheet S. The decurling amount can be adjusted by changing the pressure exerted from a decurler roller 97 in the decurler unit 96. Then, the decurler roller 97 discharges the sheet S from image forming apparatus 101. A purge tray 40 is positioned below a sheet discharge unit.

In this embodiment, the registration roller 75 is used as a registration mechanism for correcting the position of the sheet S with respect to the sheet conveying direction and the position of the sheet S with respect to the direction orthogonal to the sheet-conveying direction. Alternatively, a registration gate and a skew correction mechanism may be provided instead of the registration roller 75. In this case, the sheet-conveying device 100 controls the timing in which the sheet S is conveyed to a secondary transfer part between the roller 62 and the secondary transfer roller 14. More specifically, the sheet-conveying device 100 controls a sheet conveying speed (i.e. speed in which the sheet S is conveyed) according to a detection result of a sheet detection sensor provided between the registration mechanism and the sheet-conveying device 100, so that the timing in which the sheet S reaches the secondary transfer part matches the timing in which the toner image on the intermediate transfer belt 15 reaches the secondary transfer part.

Although the image forming apparatus 101 is configured to transfer the toner images from the intermediate transfer belt 15 to the sheet S, the toner images formed on the multiple photoconductor drums 71 can be directly transferred to the sheet S in a superposed manner. Further, the embodiments of the present invention may be applied to a monochrome image forming apparatus.

<Configuration of Sheet-Conveying Device>

Figure 2:
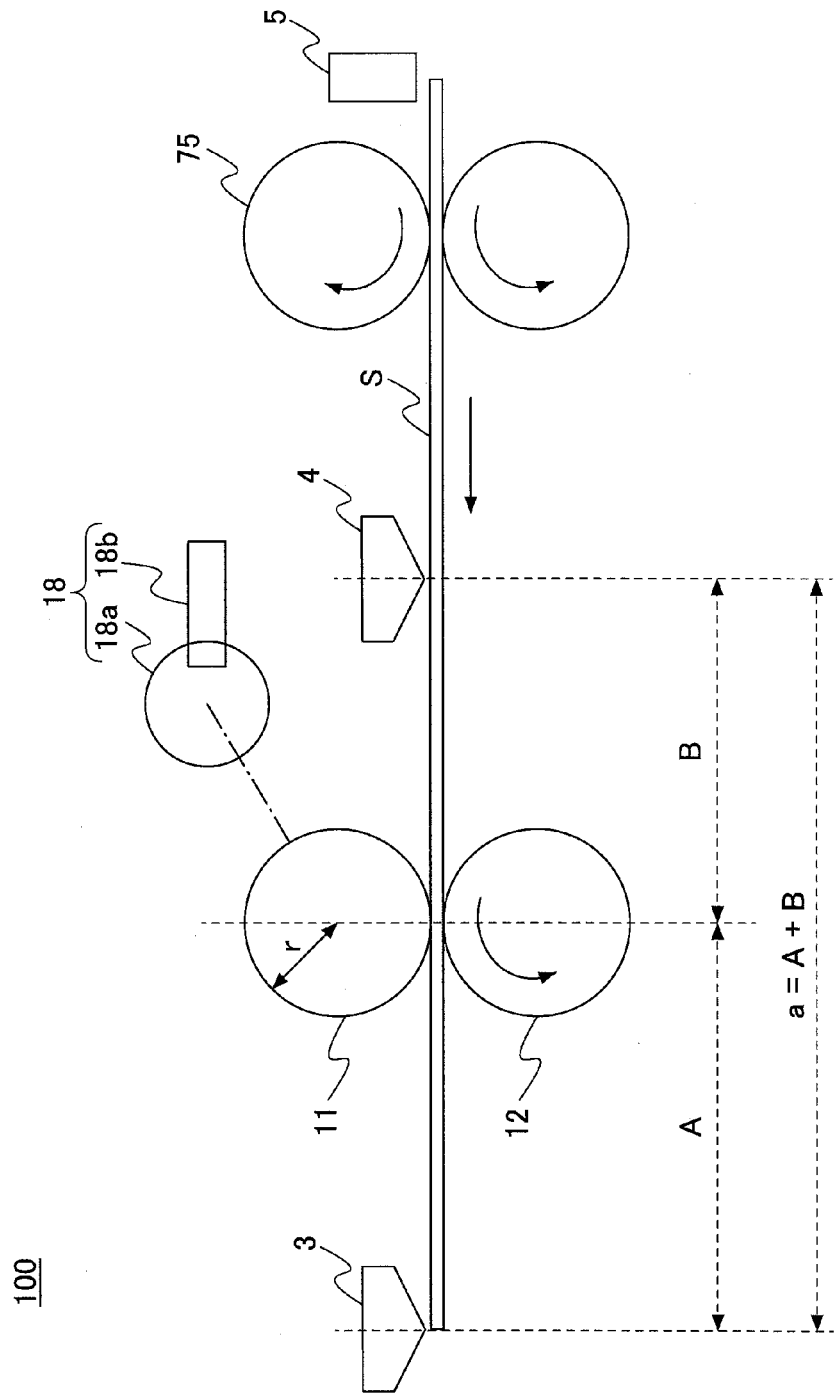
FIG. 2 is a cross-sectional view illustrating a sheet-conveying device according to an embodiment of the present invention.
Figure 3:
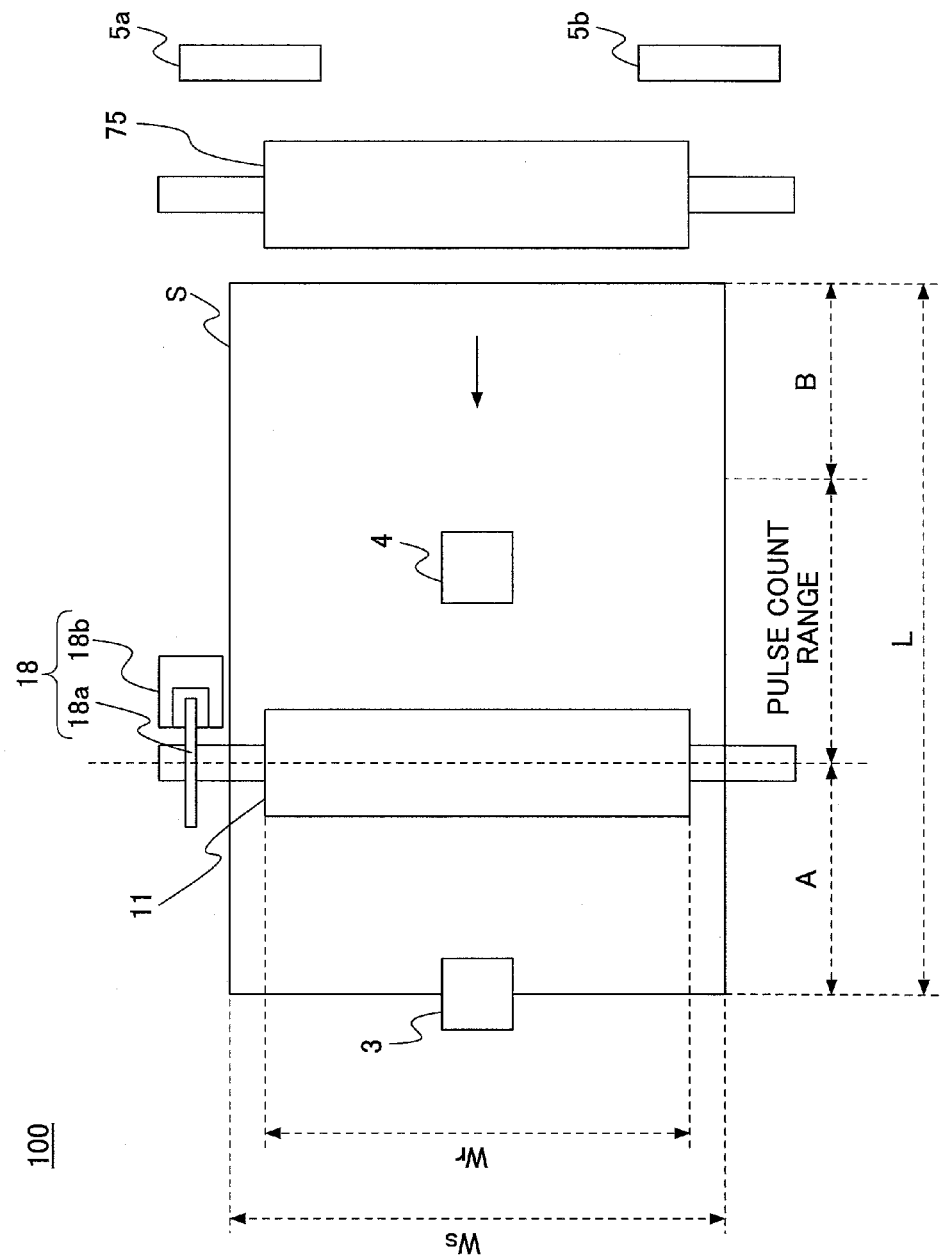
FIG. 3 is a plan view of a sheet-conveying device according to an embodiment of the present invention.

Next, a configuration of the sheet-conveying device 100 of the image forming apparatus 101 according to an embodiment of the present invention is described with reference to FIGS. 2 and 3. FIG. 2 is a cross-sectional view illustrating the sheet-conveying device 100 according to an embodiment of the present invention. FIG. 3 is a plan view of the sheet-conveying device 100 according to an embodiment of the present invention.

The sheet-conveying device 100 not only conveys the sheet S but also measures at least one of the sheet conveyance distance, the sheet length, and the sheet width of the sheet S. The sheet-conveying device 100 is positioned in an immediate vicinity of the secondary transfer device 77 and arranged more upstream of a sheet-conveyance path of the image forming apparatus 101 than the secondary transfer device 77 (see, for example, FIG. 1). As illustrated in FIG. 2, the secondary transfer device 100 transfers an image on the sheet S conveyed on the sheet-conveyance path.

The sheet-conveying device 100 includes a driving roller 12 that is rotated by a driving force of a driving unit (not illustrated) such as a motor. The sheet-conveying device 100 further includes a driven roller 11 that is rotated in a state having the sheet S nipped between the driving roller 12 and the driven roller 11.

The sheet-conveying device 100 further includes registration rollers 75 provided upstream of the driving roller 12 and the driven roller 11 with respect to the sheet-conveying direction (illustrated with an arrow in FIG. 2). The sheet-conveying device 100 further includes the secondary transfer roller 14 and the roller 62 facing the secondary transfer roller 14 interposed by the intermediate transfer belt 15 (see FIG. 1).

In FIG. 3, the driven roller 11 has a width Wr (i.e. the length of the driven roller 11 in the direction orthogonal to the sheet-conveying direction indicated with an arrow in FIG. 3) that is less than a minimum width Ws of the sheet S conveyed by the sheet-conveying device 100. Therefore, the driven roller 11 does not contact the driving roller 12 when the sheet S is being conveyed. Accordingly, the driven roller 11 can accurately measure the sheet conveyance distance of the sheet S (with the below-described method) without being affected by the driving roller 12 when the sheet S is being conveyed.

As illustrated in FIGS. 2 and 3, a rotary encoder 18 is provided on a rotation axis of the driven roller 11 of the sheet-conveying device 100. The below-described pulse counting unit 21 (not illustrated in FIGS. 2 and 3) serves as a conveyance amount measurement unit that measures the amount in which the sheet S is conveyed by measuring a rotation amount of the driven roller 11. More specifically, the pulse counting unit 21 measures the rotation amount of the driven roller 11 by counting the pulse signals generated by an encoder sensor 18b that detects the slits formed in a rotating encoder disk 18a of the rotary encoder 18.

Although the rotary encoder 18 is provided on the rotation axis of the driven roller 11 in this embodiment, the rotary encoder 18 may be provided on a rotation axis of the driving roller 12. The roller (driven roller 11 or driving roller 12) to which the rotary encoder 18 is attached preferably has a small diameter because the sheet conveyance distance of the sheet S can be measured with higher accuracy as the diameter of the roller becomes smaller. That is, because the number of times of rotations of the roller (corresponding to the conveying of the sheet S) increases as the diameter of the roller becomes smaller, the sheet conveyance distance of the sheet S can be measured with higher accuracy.

The roller (driven roller 11 or driving roller 12) to which the rotary encoder 18 is attached is preferred to be made of a metal material for restraining axial runout of the roller (driven roller 11 or driving roller 12). By restraining the axial runout, the sheet conveyance distance of the sheet S can be measured with high accuracy.

A sensor 3 is provided in the vicinity of the driven roller 11 and the driving roller 12 on the downstream side of the sheet-conveyance direction of the sheet S. A sensor 4 is provided in the vicinity of the driven roller 11 and the driving roller 12 on the upstream side of the sheet-conveyance direction of the sheet S. Each of the sensors 3, 4 detects an end part (sheet end part) of the sheet S that is being conveyed. Each of the sensors 3, 4 may be a thru-beam type sensor or a reflective type sensor that can detect the sheet end part with high accuracy. In this embodiment, the sensors 3, 4 are reflective type sensors.

In this embodiment, the sensor 3 is an example of a start trigger sensor (downstream detection unit) that detects a front end part of the sheet S that is being conveyed. Further, the sensor 4 is an example of a stop trigger sensor (upstream detection unit) that detects a rear end part of the sheet S that is being conveyed.

As illustrated in FIG. 3, the sensor 3 and the sensor 4 are provided substantially at the same position in a width direction of the sheet 3 (sheet-width direction) that is orthogonal to the sheet-conveyance direction of the sheet S. By providing the sensors 3, 4 at substantially the same position in the sheet-width direction, detection performance of the sensors 3, 4 is affected only to a minimal amount by a skew of the sheet S with respect to the sheet-conveyance direction (position of the sheet S being conveyed). Thereby, the sheet conveyance distance of the sheet S can be measured more accurately.

Although each of the sensors 3, 4 is provided at a center position in the sheet width direction of the sheet S, the sensors 3, 4 may deviate from the center position in the sheet width direction of the sheet S as long as the sensors 3, 4 are positioned within an area in which the conveyed sheet S passes.

As illustrated in FIG. 2, the sheet conveying device 100 has a line sensor 5 provided at an upstream side of the registration rollers 45 with respect to the sheet-conveyance direction of the sheet S. The line sensor 5 is, for example, a CIS (Contact Image Sensor). In the embodiment illustrated in FIG. 3, the line sensor 5 is constituted by sensors 5a, 5b, each of which detects a side end part of the sheet S in the sheet-width direction. The sheet conveying device 100 measures the width of the sheet S based on the positions of the side end parts of the sheet S detected by the line sensor 5.

A distance A illustrated in FIGS. 2, 3 indicates a distance of the start trigger sensor 3 with respect to the driven roller 11 and the driving roller 12. A distance B illustrated in FIGS. 2, 3 indicates a distance of the stop trigger sensor 4 with respect to the driven roller 11 and the driving roller 12. The distance A and the distance B are preferred to be as short as possible because the below-described pulse count range increases.

In a case where the driving roller 12 is rotating (arrow direction of FIG. 2) when the sheet S is not being conveyed (idling state), the driven roller 11 is rotated by the driving roller 12. In a case where the driving roller 12 is rotating (arrow direction of FIG. 2) when the sheet S is being conveyed, the driven roller 11 is rotated by the sheet S. When the driven roller 11 rotates, a pulse(s) is generated from the rotary encoder 18 provided on the rotation axis of the driven roller 11.

In a case where the sheet S being conveyed in the arrow direction of FIG. 2 passes the start trigger sensor 3, the pulse counting unit 21 (not illustrated in FIGS. 2 and 3) connected to the rotary encoder 18 starts counting the pulses of the rotary encoder 18 when the start trigger sensor 3 detects the front end part of the sheet S. In a case where the sheet S being conveyed in the arrow direction of FIG. 2 passes the stop trigger sensor 4, the pulse counting unit 21 (not illustrated in FIGS. 2 and 3) stops counting the pulses of the rotary encoder 18 when the stop trigger sensor 4 detects the rear end part of the sheet S.

Figure 4:
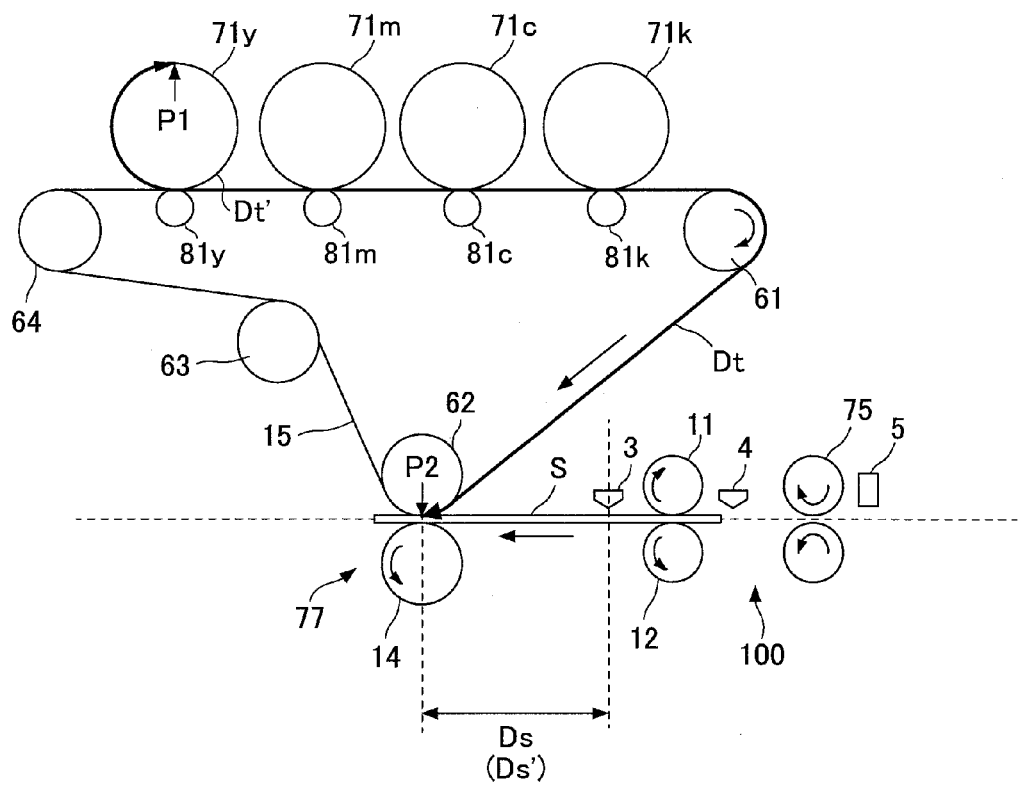
FIG. 4 is a schematic diagram for describing a position(s) of the sheet-conveying device according to an embodiment of the present invention.

In the sheet conveying direction 100 according to the embodiment illustrated in FIG. 4, a distance between the start trigger sensor 3 and the secondary transfer device 77 in the sheet-conveyance path is indicated as "Ds". Further, "P1" indicates a position at which the exposing device 55 (not illustrated in FIG. 4) forms an electrostatic latent image on the photoconductor drum 71 positioned most upstream in the rotation direction of the intermediate transfer belt 15 (in this embodiment, photoconductor drum 71y). Further, in a case a toner image is transferred from the photoconductor drum 71 to the intermediate transfer belt 15, "P2" indicates a position at which the secondary transfer device 77 transfers the toner image of the intermediate transfer belt 15 to the sheet S. Further, "Dt" indicates a distance in which the toner image is moved (carried) from the position P1 to the position P2. The distance Ds is preferred to be shorter than the distance Dt. The image conveying device 100 is preferred to be positioned immediately upstream of the secondary transfer device (image forming unit) 77 in the sheet-conveyance direction of the sheet S. Further, the image conveyance device 100 is preferred to be positioned as near as possible to the secondary transfer device 77.

In a case where the image forming apparatus 101 is a color image forming apparatus or a monochrome image forming apparatus that forms a toner image directly from the photoconductor drum 71 to the sheet S, the photoconductor drum 71 (in a case of using multiple photoconductor drums 71, the photoconductor drum 71 positioned most upstream in the sheet-conveyance direction) is positioned substantially at the same position as the secondary transfer device 77. In this case, a peripheral length of the photoconductor drum 71 is substantially equivalent to a distance from a position at which an electrostatic latent image is formed on the photoconductor drum 71 by the exposing device 55 to a position at which a toner image is transferred to the sheet S. In this case, a distance Ds' between the start trigger sensor 3 and the photoconductor drum 71 is preferred to be shorter than the peripheral length of the photoconductor drum 71. In this case, the image conveying device 100 is preferred to be positioned immediately upstream of the photoconductor drum (image forming unit) 71 in the sheet-conveyance direction of the sheet S. Further, the image conveyance device 100 is preferred to be positioned as near as possible to a position where the toner image is transferred from the photoconductor drum 71 to the sheet S.

In a case of printing an image on a first side of the sheet S1, the sheet S shrinks after the sheet S passes the fixing device 50. However, the shape of the sheet S changes in a recovering direction along with the elapsing of time. In the image forming apparatus 101 of this embodiment, the length of the sheet S is measured immediately before the toner image is transferred to the sheet. Accordingly, by performing magnification correction on the image to be printed on the sheet S based on the results of measuring the sheet length immediately before the transferring of the toner image, the accuracy of front/back registration can be improved.

<Functional Configuration of Image Forming Apparatus>

Figure 5:
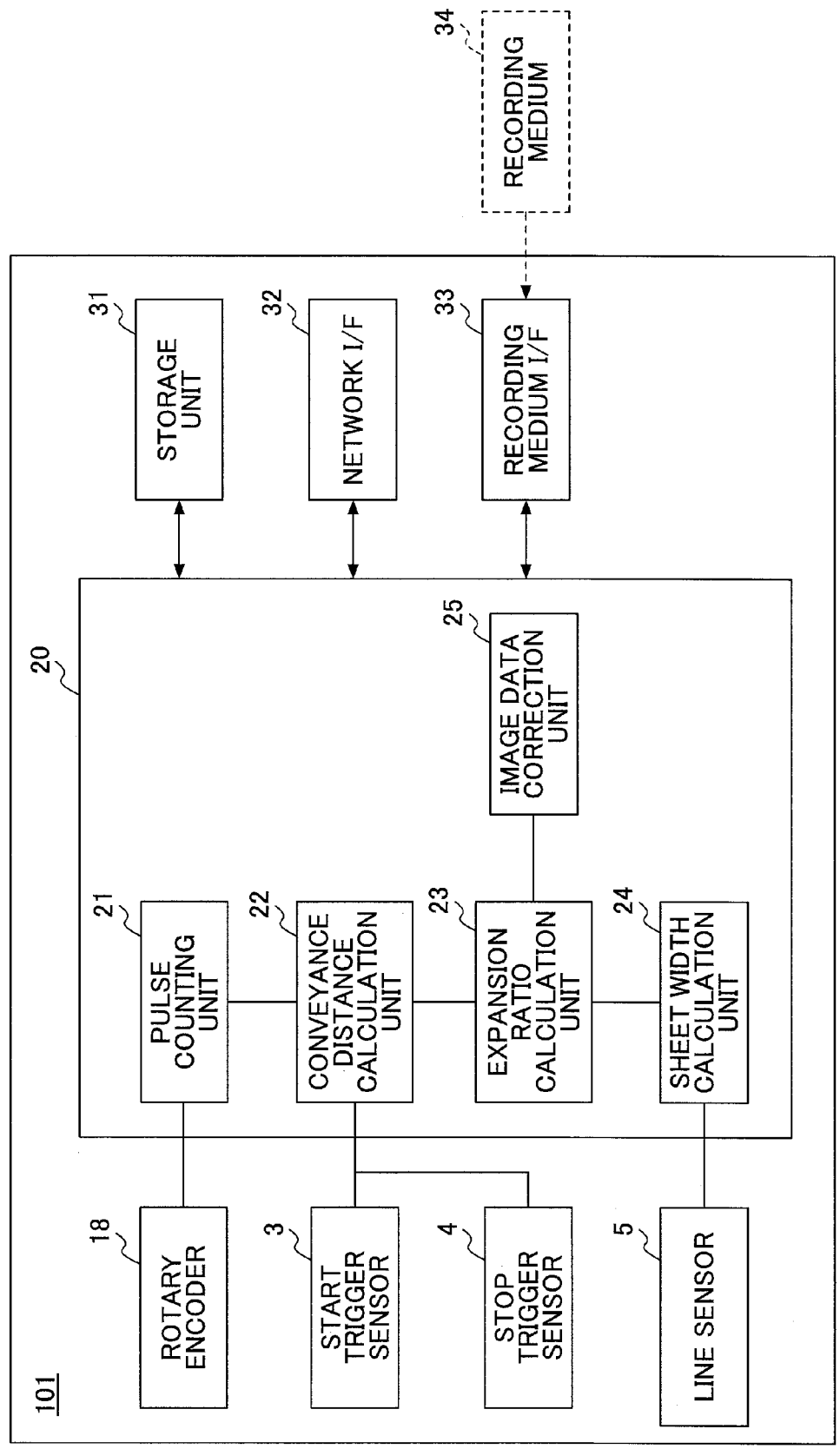
FIG. 5 is a block diagram illustrating a functional configuration of an image forming apparatus according to an embodiment of the present invention.

FIG. 5 is a block diagram illustrating a functional configuration of the image forming apparatus 101 according to an embodiment of the present invention.

As illustrated in FIG. 5, the image forming apparatus 101 includes, for example, the start trigger sensor 3, the stop trigger sensor 4, the line sensor 5, the rotary encoder 18, a control unit 20, a storage unit 31, a network interface (I/F) 32, and a recording medium interface (I/F) 33.

The control unit 20 is configured to include, for example, a CPU (Central Processing Unit). The control unit 20 also includes functional units such as the pulse counting unit 21, a conveyance distance calculation unit 22, an expansion/shrinkage ratio calculation unit (hereinafter referred to as "expansion ratio calculation ratio" for the sake of convenience) 23, a sheet width calculation unit 24, and an image data correction unit 25. The control unit 20 serves as an operation device that controls operations of the image forming apparatus 101 by reading a program(s) and data from the storage unit 31 and executing various processes using the program and data.

The pulse counting unit 21 measures the rotation amount of the driven roller 11 by counting the pulse signals generated by the rotary encoder 18 provided to the driven roller 11. More specifically, the pulse counting unit 21 counts the pulse signals generated by the encoder sensor 18b in correspondence with the rotation of the encoder disk 18a of the rotary encoder 18. The rotation amount of the driven roller 11 is measured as the conveyance amount of the sheet S.

The conveyance distance calculation unit 22 calculates the conveyance distance of the sheet S or the length of the sheet S in the sheet-conveyance direction (hereinafter also referred to as "sheet length") based on sheet detection results of the start and stop trigger sensors 3, 4 and the rotation amount of the driven roller 11 measured by the pulse counting unit 21.

The sheet width calculation unit 24 calculates the width of the sheet S (i.e. length of the sheet S in a direction orthogonal to the sheet-conveyance direction, hereinafter also referred to as "sheet width") based on a detection result of the line sensor 5.

The expansion ratio calculation unit 23 calculates, for example, a ratio of expansion or shrinkage of the sheet S before and after an image is printed on one side of the sheet S. For the sake of convenience, the ratio of expansion or shrinkage is simply referred to as "expansion ratio" unless described to be otherwise. The expansion ratio calculation unit 23 calculates the expansion ratio of the sheet S based on the sheet conveyance distance or the sheet length of the sheet S calculated by the conveyance distance calculation unit 22 and the sheet width of the sheet S calculated by the sheet width calculation unit 24.

The image data correction unit 25 corrects image data based on the expansion ratio of the sheet S calculated by the expansion ratio calculation unit 23.

The storage unit 31 is a storage device that stores, for example, programs and data therein. The storage unit 31 may include, for example, a non-volatile storage device (e.g., HDD (Hard Disk Drive), ROM (Read Only Memory)) and a volatile storage device (e.g., RAM (Random Access Memory)).

The network I/F 32 is an interface that connects the image forming apparatus 101 to a device having a function capable of communicating via a network constituted by wired and/or wireless data transmission paths. The network may be, for example, a LAN (Local Area Network) or a WAN (Wide Area Network).

The recording medium I/F 33 is an interface that connects the image forming apparatus 101 to a recording medium 34. The image forming apparatus 101 can read and/or write data with respect to the recording medium 34 by way of the recording medium I/F 33. The recording medium 34 may be, for example, a flexible disk, a CD (Compact Disk), a DVD (Digital Versatile Disk), an SD (Secure Digital) memory card, or a USB (Universal Serial Bus) memory.

<Sheet Conveyance Distance Calculation Method>

Next, an example of a method for calculating a conveyance distance of the sheet S with the image forming apparatus 101 is described.

Figure 6:
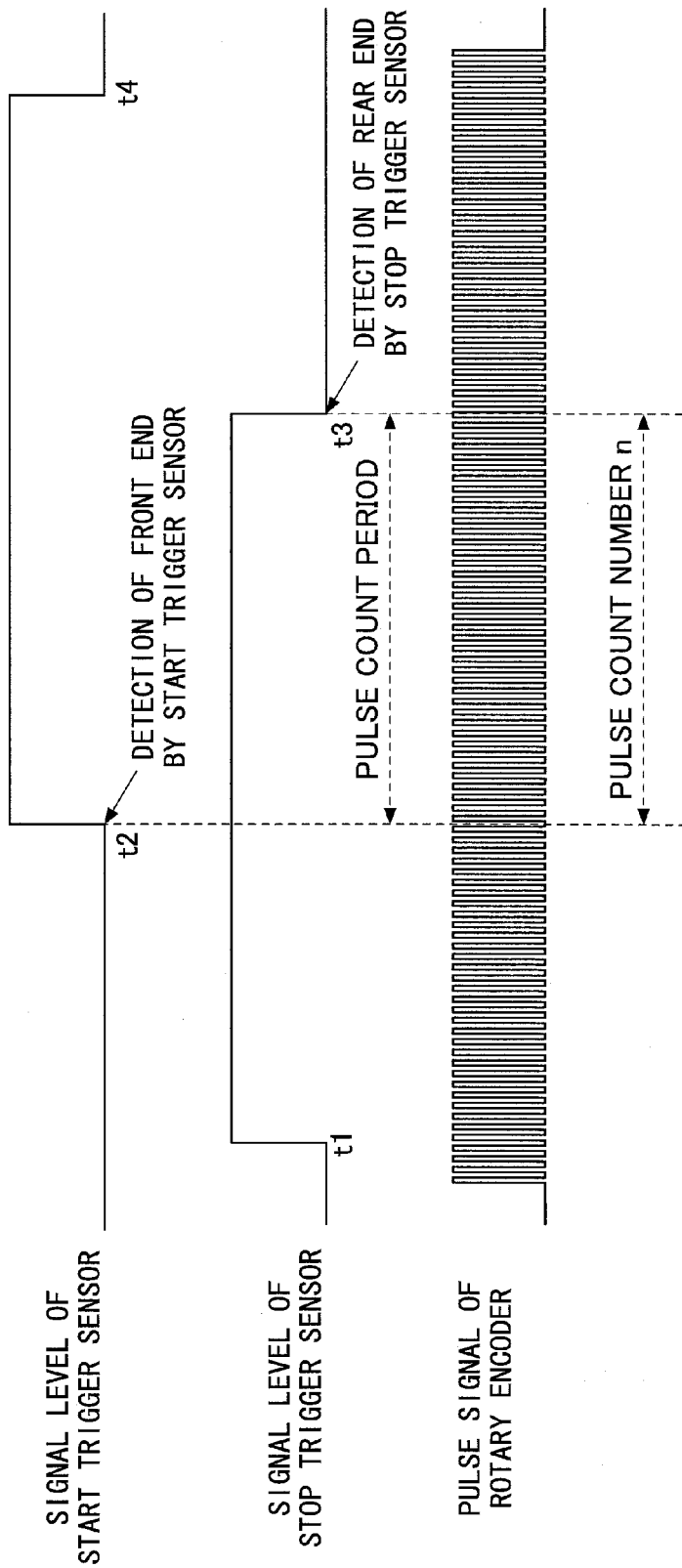
FIG. 6 is a schematic diagram illustrating an example of signals output from a start trigger sensor, a stop trigger sensor, and a rotary encoder according to an embodiment of the present invention.

FIG. 6 is a schematic diagram illustrating an example of signals output from the start trigger sensor 3, the stop trigger sensor 4, and the rotary encoder 18.

As described above, the rotary encoder 18 provided to the rotation axis of the driven roller 11 generates pulse signals when the driven roller 11 is rotated.

According to the example illustrated in FIG. 6, in a case where conveying of the sheet S has been started, the stop trigger sensor 4 detects the passing of the front end part of the sheet S at a time t1. Further, the start trigger sensor 3 detects the passing of the front end part of the sheet S at a time t2.

Then, the stop trigger sensor 4 detects the passing of the rear end part of the sheet S at time t3. Then, the start trigger sensor 3 detects the passing of the rear end part of the sheet S at time t4.

The pulse counting unit 21 counts the pulse signals of the rotary encoder 18 during a pulse count period starting from the time t2 (i.e. when the passing of the front end part of the sheet S is detected by the start trigger sensor 3) to the time t3 (i.e. when the passing of the rear end part of the sheet is detected by the stop trigger sensor 4).

In the below-described formula (1), a radius of the driven roller 11 provided to the rotary encoder 18 is indicated as "r", the number of pulses of the rotary encoder 18 (hereinafter also referred to as "encoder pulses") 18 that are generated in correspondence with a single rotation of the driven roller 11 is indicated as "N", and the number of pulses counted during the pulse count period is indicated as "n". Accordingly, a conveyance distance Ld of the sheet S during the pulse count time (i.e. from time t2 to time t3) can be obtained by the following formula (1).

$$Ld=(n/N)\times 2\pi r, \qquad \text{<Formula (1)>}$$

wherein "n" is the counted number of pulses, "N" is the encoder pulses [/r] for a single rotation of the driven roller 11, and "r" is a radius [mm] of the driven roller 11.

Typically, the sheet conveyance speed changes depending on, for example, the precision of the external shape of a roller that conveys the sheet S (mainly the driving roller 12), mechanical precision (e.g., axial runout) of the roller that conveys the sheet S, the precision of a motor that drives the roller that conveys the sheet S, and the precision of a power transmission mechanism (e.g., gear, belt) of the roller that conveys the sheet S. Further, the sheet conveyance speed also changes depending on, for example, a slip phenomenon that occurs between the driving roller 12 and the sheet S or a loosening phenomenon caused by a difference between a sheet conveyance force/sheet conveyance speed at an upstream side of a conveying unit and a sheet conveyance force/sheet conveyance speed at a downstream side of the conveying unit. Therefore, a pulse cycle of the rotary encoder 18 or a pulse width of the rotary encoder 18 changes almost constantly. However, the number of pulses of the rotary encoder 18 does not change.

Therefore, the conveyance distance calculation unit 22 provided in the sheet conveying device 100 uses the formula (1) and accurately obtains the conveyance distance Ld (i.e. distance in which the sheet S is conveyed by the driven and driving rollers 11, 12) without relying on sheet conveyance speed.

The expansion ratio calculation unit 23 can obtain various relative ratios based on the calculation results of the conveyance distance calculation unit 22. For example, the expansion ratio calculation unit 23 obtains a ratio between one page of a sheet S and another page of a sheet S or a ratio between a front side of a sheet S and a back side of the sheet S.

For example, the expansion ratio calculation unit 23 calculates an expansion ratio R of the sheet S based on a relative ratio between a sheet conveyance distance obtained by the conveyance distance calculation unit 22 before performing a fixing process on the sheet S and a sheet conveyance distance obtained by the conveyance distance calculation unit 22 after performing the fixing process on the sheet S. More specifically, the expansion ratio calculation unit 23 calculates the expansion ratio R by using the following formula (2).

$$R=[(n2/N)\times 2\pi r]/[(n1/N\times 2\pi r], \qquad \text{<Formula (2)>}$$

wherein "n1" is the number of pulses counted during the conveying of the sheet S before performing a fixing process on the sheet S, and "n2" is the number of pulses counted during the conveying of the sheet S after performing the fixing process on the sheet S.

Next, a test calculation of the expansion ratio according to an embodiment of the present invention is described.

In this embodiment, in a case of vertically conveying a sheet S having an A3 size where N=2800 [/r], r=9 [mm], and n1 (number of pulses counted when conveying of the sheet S before a fixing process is performed on the sheet S)=18816, the conveyance distance Ld1 of the sheet S is obtained as follows.

$$Ld1=(18816)/2800)\times 2\pi\times 9=380.00 \text{ [mm]}$$

Further, in a case of vertically conveying the sheet S having an A3 size where n2 (number of pulses counted when conveying of the sheet S after the fixing process is performed on the sheet S)=18759, the conveyance distance Ld2 of the sheet S is obtained as follows.

$$Ld2=(18759)/2800)\times 2\pi\times 9=378.86 \text{ [mm]}$$

Accordingly, a front/back of the conveyance distance of the sheet S is calculated as follows.

$$\Delta Ld=380.0-378.86=1.14 \text{ [mm]}$$

Accordingly, based on the result of calculating the front/back of the conveyance distance of the sheet S, the expansion ratio calculation unit 23 can obtain the expansion ratio Lr of the sheet S (i.e. relative ratio between a front sheet length of the sheet S and a back sheet length of the sheet S) can be obtained as follows.

$$Lr=378.86/380.00=99.70[\%]$$

Therefore, a front/back registration error of approximately 1 mm would occur if an image to be formed on a front side of the sheet S and an image to be formed on a back side of the sheet S are set with an equal length because the length of the sheet S in the sheet-conveyance direction shrinks approximately 1 mm as a result of performing a thermal fixing process on the sheet S. Accordingly, the image data correction unit 25 corrects the length of the image to be formed on the back side of the sheet S based on the expansion ratio Lr. Thus, the accuracy of the front/back registration can be improved.

Further, the expansion ratio calculation unit 23 can calculate the expansion ratio Wr of the sheet S with respect to the width direction of the sheet S based on a width W of the sheet S calculated by the sheet width calculation unit 24. Accordingly, the image data correction unit 25 corrects the length of the image to be formed on the back side of the sheet S based on the expansion ratio Wr calculated by the expansion ratio calculation unit 23.

In this embodiment, the expansion ratio calculation unit 23 calculates the expansion ratio Lr by obtaining the conveyance distance Ld1, Ld2 of the sheet S before and after performing a thermal fixing process on the sheet S. Alternatively, the expansion ratio calculation unit 23 may calculate the expansion ratio Lr by obtaining the pulse count n1, n2 obtained when conveying the sheet S before and after performing a thermal fixing process on the sheet S.

For example, the expansion ratio Lr may be obtained in the above-described case of vertically conveying the sheet S having an A3 size where n1 (number of pulses counted when conveying of the sheet S before a fixing process is performed on the sheet S)=18816 and n2 (number of pulses counted when conveying of the sheet S after the fixing process is performed on the sheet S)=18759.

$$Lr=n2/n1=18759/18816=99.70[\%]$$

As shown in the following formula (3), a length L of the sheet S in the sheet-conveyance direction can be obtained by adding a distance "a" between the start trigger sensor 3 and the stop trigger sensor 4 of FIG. 2 to the conveyance distance Ld obtained by the formula (1).

$$L=(n/N)\times 2\pi r+a, \qquad \text{<Formula (3)>}$$

wherein "a" is the distance between the start trigger sensor 3 and the stop trigger sensor 4.

Accordingly, the conveyance distance calculation unit 22 of the sheet conveyance apparatus 100 obtains the length L of the sheet S in the sheet-conveyance direction by using the formula (3) in which the distance "a" between the start trigger sensor 3 and the stop trigger sensor 4 is added to the conveyance distance Ld obtained by the formula (1).

Further, as shown in the following formula (4), the expansion ratio Lr can be obtained by the relative ratio of the length L of the sheet in the sheet-conveyance direction before performing the thermal fixing process on the sheet S and the length of the sheet in the sheet-conveyance direction after performing the thermal fixing process.

$$Lr=[(n2/N)\times 2\pi r+a]/[(n1/N)\times 2\pi r+a] \qquad \text{<Formula (4)>}$$

Accordingly, the expansion ratio calculation unit 23 of the sheet conveyance apparatus 100 obtains the expansion ratio Lr of the sheet S based on the length L of the sheet S that is accurately obtained by the conveyance distance calculation unit 22.

<Image Data Correction Method>

Next, a method for correcting image data of the image forming apparatus 101 according to an embodiment of the present invention is described. In the image forming apparatus 101, the expansion ratio calculation unit 23 calculates the expansion ratio of the sheet S based on the conveyance distance Ld or the sheet length L calculated by the conveyance distance calculation unit 22 and the sheet width W calculated by the sheet width calculation unit 24 and corrects the image data to be printed on the sheet S.

Figure 7:
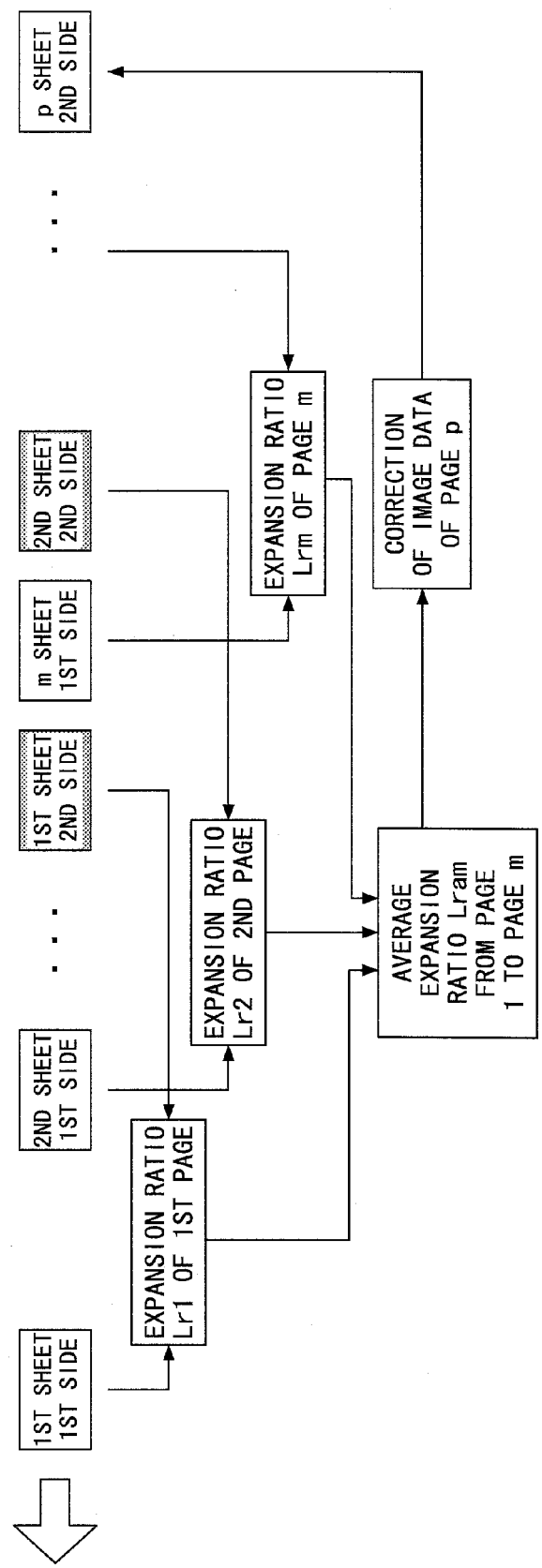
FIGS. 7-9 are schematic diagrams for describing an example of an image data correction process of an image forming apparatus according to an embodiment of the present invention.

FIG. 7 is a schematic diagram for describing an example of an image data correction process of the image forming apparatus 101 according to an embodiment of the present invention. In the example of FIG. 7, a double-side printing process is consecutively (serially) performed on multiple sheets S by the image forming apparatus 101.

In performing the double-side printing process illustrated in FIG. 7, the image forming apparatus 101, first, prints an image on a first side (front side) of a first sheet, and then prints an image on a first side of a second sheet. A sheet S having an image printed on its first side is flipped upside-down and conveyed by way of the sheet inverting path 93 and the double-side conveyance path 94. Then, the sheet S is conveyed to the secondary transfer device 77 in the flipped state by way of the sheet conveying device 100. Then, an image is printed on a second side of the sheet S by the secondary transfer device 77.

With the image forming apparatus 101 according to an embodiment of the present invention, an $m^{th}$ sheet is conveyed between a first sheet having an image printed on its first side and a second sheet having an image printed on its first side. Accordingly, an image is printed on a first side of the $m^{th}$ sheet after an image is printed on a second side (back side) of the first sheet. In performing the consecutive double-side printing process with the image forming apparatus 101, the intervals between the sheets can be shortened by conveying a sheet S that is to have an image printed on its first side in-between sheets that are to have images printed on their second side. Accordingly, double-side printing can be consecutively performed at high speed.

In performing the double-side printing process on multiple sheets S, the expansion ratio calculation unit 23 uses the formula (2) to calculate the expansion ratio Lr of each of the multiple sheets S based on the conveyance distance Ld calculated by the conveyance distance calculation unit 22 during a process of printing an image on a first side of the sheet S and the conveyance distance Ld calculated by the conveyance distance calculation unit 22 during a process of printing an image on a second side of the sheet S. Then, as shown in the following formula (5), the expansion ratio calculation unit 23 calculates an average value Lram of the expansion ratios Lr of the multiple sheets (m sheets) S.

$$Lram=(Lr1+Lr2+\ldots+Lrm)/m \qquad \text{<Formula (5)>}$$

In a similar manner, the expansion ratio calculation unit 23 calculates an expansion ratio Wr of each of the multiple sheets S based on the sheet width W of each of the multiple sheets S obtained by the sheet width calculation unit 24. Then, the expansion ratio calculation unit 23 calculates an average value Wram of the expansion ratios Wr of the multiple sheets (m sheets) S.

Then, the image data correction unit 25 corrects a size of image data to be printed on a $p^{th}$ sheet and a timing of exposing the photoconductor drum 71 with the exposing device 55 based on the average values of the expansion ratios Lram, Wram obtained by the expansion ratio calculation unit 23. It is preferable to perform the image data correction process on a $p^{th}$ sheet S by using the average values of the expansion ratios Lram, Wram obtained from m sheets conveyed immediately before the $p^{th}$ sheet S.

Because an image magnification can be corrected in correspondence with the measured size of the sheet S and an initial printing position can be adjusted by the image data correction unit 25, an image can be formed on the sheet S without being affected by deformation of the sheet S caused by the fixing device 50. Accordingly, even if the sheet S is deformed after passing through the fixing device 50, an accurate front/back registration can be achieved by correcting image data and forming an image based on the corrected image data.

In the above-described embodiment, the image data correction method is performed in a case where m=3, p=7. Accordingly, image data to be printed on or after the $7^{th}$ sheet is corrected based on the average expansion ratios Lram, Wram obtained from 3 sheets conveyed immediately before the $7^{th}$ sheet. It is, however, to be noted that the sheet that is first subjected to the image data correction process is not limited to "7" and the number of sheets to be used for obtaining the average expansion ratios is not limited to "3". That is, the sheet that is first subjected to the image data correction process (p) and the number of sheets to be used for obtaining the average expansion ratios (m) are to be arbitrarily set.

Alternatively, "m" may be set to "1", so that the image data correction process is performed on a $p^{th}$ sheet S based on an expansion ratio obtained from a single sheet S conveyed immediately before the $p^{th}$ sheet S. However, in order to perform magnification correction with high accuracy, the use of multiple sheets S is preferred ("m>1"), so that an average expansion ratio (Lram, Wram) can be obtained from the multiple sheets S.

Further, the expansion ratio calculation unit 23 may obtain an average expansion ratio Lram' by using the following formula (6) in a case where a conveyance distance for printing an image on a first side of the $1^{st}$ sheet to $m^{th}$ sheet is indicated as "Lf1, Lf2, ... Lfm", and a conveyance distance for printing an image on a second side of the $1^{st}$ sheet to $m^{th}$ sheet is indicated as "Ls1, Ls2, ... Lsm".

$$Lram'=((Ls1+Ls2+\ldots+Lsm)/m)/((Lf1+Lf2+\ldots+Lfm)/m) \qquad \text{<Formula (6)>}$$

Further, similar to the use of formula (6), the expansion ratio calculation unit 23 may obtain an average expansion ratio Wram' by the averages obtained by adding the widths Ws1 in printing on the first side of the $1^{st}$ sheet to the $m^{th}$ sheet S and the widths. Ws2 in printing the second side of the $1^{st}$ sheet S to the $m^{th}$ sheet.

Before obtaining the expansion ratios from the added conveyance distances with the formula (6), it is preferable to obtain the expansion ratios of each sheet and obtain the average expansion ratio by using the formula (5).

In correcting image data of a first sheet based on an expansion ratio after a double-side printing process is started, a preliminary sheet-passing process (process of passing a preliminary sheet(s) through the fixing device 50 before performing an image forming process) may be performed before printing an image on a first sheet S and an expansion ratio may be obtained before actually performing a double-side printing process on the sheet S. By performing the preliminary sheet-passing process, image data can be corrected based on an expansion ratio obtained from the preliminary sheet-passing process.

Figure 8:
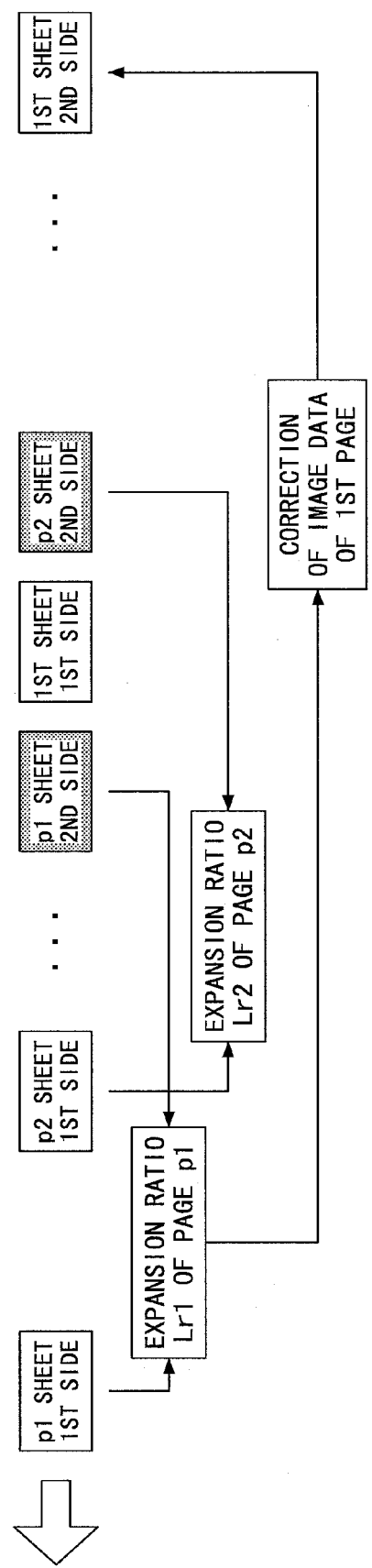

FIG. 8 is a schematic diagram illustrating an example of performing an image data correction process in a case of printing an image on a back side of a first sheet S.

In the example of FIG. 8, a preliminary sheet-passing process is performed on two preliminary sheets p1, p2 (conveyed in an order of p1, p2) under the same conditions as performing a double-side printing process. By calculating the expansion ratios Lr1, Lr2 of each of the preliminary sheets p1, p2, image data to be printed on a second side of a first sheet S can be corrected according to the expansion ratios obtained from the preliminary sheets p1, p2.

Accordingly, with the image forming apparatus 101, printing can be performed on a first sheet S with high front/back registration accuracy.

Figure 9:
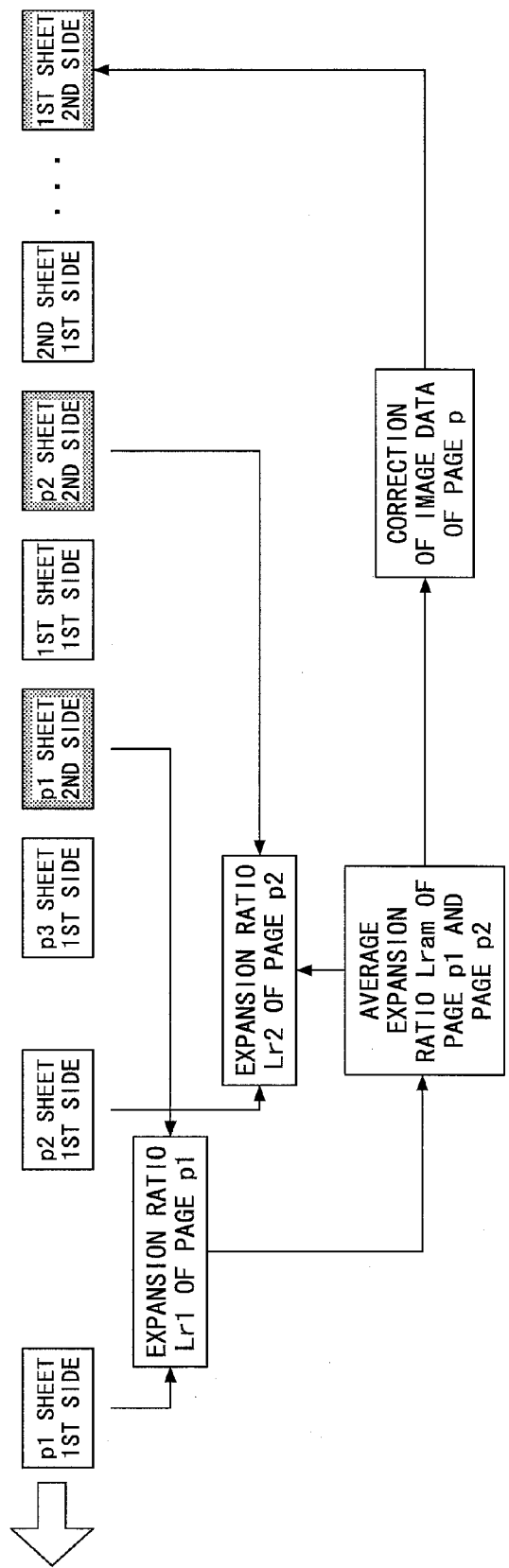

FIG. 9 is a schematic diagram illustrating an example where a preliminary sheet-passing process is performed on each of 3 preliminary sheets p1, p2, p3 (conveyed in an order of p1, p2, p3) before actually printing an image on a first sheet S under the same conditions of performing a double-side printing process on the sheet S.

In the example of FIG. 9, an average expansion ratio Lram is obtained from expansion ratios Lr1, Lr2 of the preliminary sheets p1, p2 before forming an image on a second side of a first sheet S. Accordingly, image data to be printed on the second side of the first sheet S is corrected by using the average expansion ratio Lram obtained before the forming of an image on the second side of the first sheet S.

Accordingly, data of an image to be actually printed on a second side of a first sheet S may be corrected by using an average expansion ratio of a preliminary sheet. Therefore, similar to the example of FIG. 8, the image forming apparatus 101 can perform printing on the first sheet S with high front/back registration accuracy. By using the average expansion ratio, front/back registration accuracy can be improved.

In performing the preliminary sheet-passing process, the fixing device 50 is preferred to be controlled under the same conditions when performing a fixing process where pressure and heat are applied to the sheet S. Further, in performing the preliminary sheet-passing process, an image may be formed on a first side of the preliminary sheet passed through the fixing device 50. Further, the preliminary sheet is preferred to be the same type of sheet as the sheet S on which an image is actually printed. By performing the preliminary sheet-passing process under the same conditions as performing an image forming process, expansion ratio can be obtained with high accuracy, and front/back registration accuracy can be improved.

Next, an example of procedures of a magnification correction process performed by the image data correction unit 25 is described. That is, in the below-described magnification correction process, the image data correction unit 25 corrects the magnification of an image based on an expansion ratio of a sheet S calculated by the expansion ratio calculation unit 23.

Although not illustrated, an exposing device 55 of the image forming apparatus 101 may include, for example, a data buffer unit for serving as a buffer for image data input to the memory or the like, an image data generation unit for generating image data used for an image forming process, an image magnification correction unit for correcting a magnification of an image in a sheet-conveyance direction based on sheet-size data, a clock generation unit for generating write clock signals, and an illumination device for forming an image by radiating light to the photoconductor drum 71.

The data buffer unit uses transfer clock signals to buffer input image data from, for example, a host device (e.g., controller).

The image data generation unit generates image data based on write clock signals from the clock generation unit and pixel addition/deletion data from the image magnification correction unit. Accordingly, the image data generation unit controls the on/off switching of the illumination device in a case where a length corresponding to a single cycle of a write clock signal is assumed as a single pixel of an image to be formed.

The image magnification correction unit generates image magnification correction signals for switching the magnification of an image based on the expansion ratio calculated by the expansion ratio calculation unit 23.

The clock generation unit is operated with a frequency that is several times higher than that of the write clock signal for performing an image correction process (e.g., pulse width modulation). The clock generation unit basically generates clock signals with a frequency corresponding to, for example, the speed of the image forming apparatus 101.

The illumination device includes one or more of a semiconductor laser, a semiconductor laser array, a surface emitting laser. The illumination device radiates light to the photoconductor drum 71 in accordance with drive data for forming an electrostatic latent image on the photoconductor drum 71.

Accordingly, the image forming apparatus 101 can perform image magnification correction with high accuracy and improve front/back registration accuracy.

<Flowchart of Image Data Correction Process>

Figure 10:
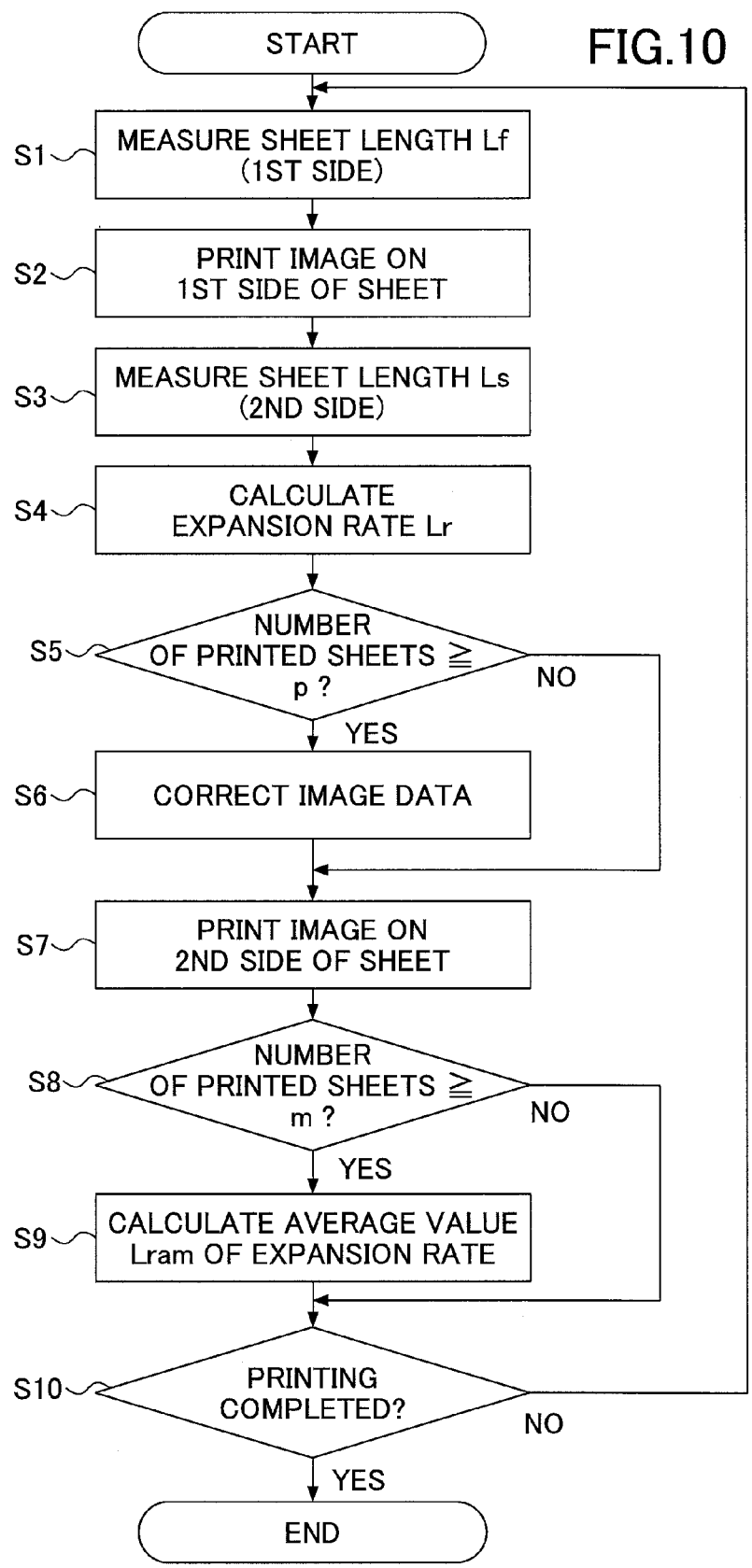
FIG. 10 is a flowchart illustrating an example of an image data correction process according to an embodiment of the present invention.

FIG. 10 is a flowchart illustrating an example of an image data correction process according to an embodiment of the present invention. In the example of FIG. 10, expansion ratio of a sheet S is obtained based on a sheet-conveyance distance of the sheet S obtained by the conveyance distance calculation unit 22.

In FIG. 10, when the image forming apparatus 101 starts a double-side printing process, the conveyance distance calculation unit 22 calculates a conveyance distance (or sheet length) Lf for printing an image on a first side of the sheet S (Step S1). Then, a toner image is transferred from the secondary transfer device 77 to the first side of the sheet S and fixed to the first side of the sheet S by the fixing device 50 (Step S2). After an image is formed on the first side of the sheet S, the sheet S is flipped upside down and is conveyed in the flipped state. Then, the conveyance distance calculation unit 22 calculates a conveyance distance (or sheet length) Ls for printing an image on a second side of the sheet S (Step S3). Then, the expansion ratio calculation unit 23 calculates an expansion ratio Lr of the sheet S (Step S4).

Then, it is determined whether the printed number of sheets is equal to or greater than p sheets (Step S5). In a case where the printed number of sheets is equal to or greater than p sheets (Yes in Step S5), the image data correction unit 25 corrects image data based on an average value Lram of expansion ratios Lr stored in the storage unit 31 (Step S6). Then, an image is printed on the second side of the sheet S based on the corrected image data (Step S7).

Then, it is determined whether the printed number of sheets is equal to or greater than m (Step S8). In a case where the printed number of sheets is equal to or greater than m (Yes in Step 8), the expansion ratio calculation unit 23 calculates an average expansion ratio Lram of the expansion ratios Lr and stores the average expansion ratio Lram in the storage unit 31 (Step S9).

Then, it is determined whether a double-side printing process (image forming process) for a predetermined number of sheets S is completed (Step S10). The steps S1-S9 are repeated until the double-side printing process is performed on the predetermined number of sheets S. After the double-side printing process is completed for the predetermined number of sheets S, the image data correction data process of FIG. 10 is terminated.

Although a method of calculating the average expansion ratio Lram of the expansion ratios Lr obtained from the conveyance distances Ld (or sheet lengths L) of the sheet S is described above, the average expansion ratio Wram of the expansion ratios Wr obtained from the line sensor 5 and the sheet width calculation unit 24 may be obtained in a similar manner.

In the image forming apparatus 101 of the above-described embodiment, the conveyance distance Ld (or sheet length L) of the sheet S and the width W of the sheet S are measured by using separate measurement mechanisms, and the conveyance distance Ld (or sheet length L) of the sheet S and the width W of the sheet S are measured sheet-by-sheet.

Further, the expansion ratio calculation unit 23 separately obtains average expansion ratios Lram, Wram of the sheet S based on the conveyance distance Ld (or sheet length L) of the sheet S and the width W of the sheet S. The width W of the sheet S may be measured from multiple parts (e.g., two parts) of the sheet S where the multiple parts are positioned in different areas of the sheet S with respect to the sheet-conveyance direction. In this case, average expansion ratios Wram1, Wram2 of expansion ratios Wr1, Wr2 obtained from the multiple parts are obtained based on the widths W1, W2 measured from the multiple parts of the sheet S.

In a case where paper is used as the sheet S or in a case where a heat/pressure applying mechanism is used as the fixing device 50, the grain orientation of the paper or the pressure applied from the fixing device 50 may cause the expansion ratio of the sheet to be different with respect to the sheet-conveyance direction and the sheet-width direction. Therefore, it is preferable to separately obtain the expansion ratio and calculate the average expansion ratio with respect to the sheet-conveyance direction and the sheet-width direction. Alternatively, a correction value data pertaining to, for example, the type of paper or the sheet-conveyance direction may be prepared beforehand. In this case, after obtaining one expansion ratio in the sheet-conveyance direction or the sheet-width direction, the other expansion ratio in the sheet-conveyance direction or the sheet-width direction can be obtained by using the correction value on the one expansion ratio in the sheet-conveyance direction or the sheet-width direction.

Further, in a case where the sheet S is a sheet that is not affected by factors such as grain orientation of paper, an expansion ratio with respect to one of the sheet-conveyance direction and the sheet-width direction can be obtained, and an expansion ratio with respect to the other one of the sheet-conveyance direction and the sheet-width direction may be obtained based on the expansion ratio with respect to the one of the sheet-conveyance direction and the sheet-width direction.

Hence, with the image forming apparatus 101 according to the above-described embodiment, printing can be performed with high front/back registration accuracy by measuring the size of the sheet to be printed, and correcting image data to be printed on the sheet based on the measured size.

The above-described functions of the image forming apparatus 101 may be implemented by causing a computer to execute the above-described processes according to a program encoded with a program stored in the storage unit 31 by way of the control unit 20 (e.g., CPU). Thus, the program for causing the image forming apparatus 101 to perform the above-described functions may be recorded in the computer-readable recording medium 34.

Accordingly, by recording the program in the recording medium 34 such as a floppy disk (registered trademark), a CD, a DVD, the program can be installed from the recording medium 34 to the image forming apparatus 101. Because the network I/F 32 is included in the image forming apparatus 101, the program may be downloaded from a network (e.g., the Internet) and installed in the image forming apparatus 101.

The present invention is not limited to the specifically disclosed embodiments, and variations and modifications may be made without departing from the scope of the present invention.

The present application is based on and claims benefit of priority of Japanese Priority Application Nos. 2012-170448, 2012-209244, and 2013-073916 filed on Jul. 31, 2012, Sep. 24, 2012, and Mar. 29, 2013, respectively, the entire contents of which are hereby incorporated by reference.

What is claimed is:

1. An image forming apparatus comprising:
a controller including a Central Processing Unit (CPU); and
a memory from which data is read by the CPU;
wherein the CPU executes an image forming process including
forming an image on a first recording medium based on image data;
measuring a size of the first recording medium;
calculating an expansion ratio of the first recording medium based on a first size of the first recording medium obtained before the first recording medium is passed through and a second size of the first recording medium obtained after the first recording medium is passed through; and
correcting the image data that is used for forming another image on a second recording medium conveyed after the first recording medium based on the expansion ratio of the first recording medium,
wherein the measuring includes measuring a length of the first recording medium in a sheet-conveyance direction of the first recording medium,
detecting a passing of an end of the first recording medium, detecting a passing of a first end part of the first recording medium and detecting a passing of a second end part of the first recording medium on the opposite side of the first end part,
wherein the calculating includes calculating the average of expansion ratios of the plurality of other recording media according to "Lram=(Lr1+Lr2+ . . . +Lrm)/m" and "Wram=(Wr1+Wr2+ . . . +Wrm)/m",
wherein "m" is the number of the plurality of other recording media, "Lr" is an expansion ratio based on a length of each of the plurality of other recording media, and "Wr" is an expansion ratio based on a width of each of the plurality of other recording media, and
wherein the correcting includes correcting the image data based on the calculated average of expansion ratios of the plurality of other recording media.

2. An image forming apparatus comprising:
a controller including a Central Processing Unit (CPU); and a memory from which data is read by the CPU;
wherein the CPU executes an image forming process including forming an image on a first recording medium based on image data;
measuring a size of the first recording medium; and
calculating an expansion ratio of the first recording medium based on a first size of the first recording medium obtained before the first recording medium is passed through the fixing device and a second size of the first recording medium obtained after the first recording medium is passed through fixing device
correcting the image data that is used for forming another image on a second recording medium conveyed after the first recording medium based on the expansion ratio of the first recording medium,
wherein the measuring includes measuring a length of the first recording medium in a sheet-conveyance direction of the first recording medium;
detecting a passing of an end of the first recording medium, detecting a passing of a first end part of the first recording medium and
detecting a passing of a second end part of the first recording medium on the opposite side of the first end part
wherein the calculating includes calculating the average of expansion ratios of the plurality of other recording media according to "Lram=(Lr1+Lr2+, . . . +Lmf)/m" and "Wram=fWr1+Wr2+ . . . +Wrm)/m",
wherein "m" is the number of the plurality of other recording media, "Lr" is an expansion ratio based on a length of each of the plurality of other recording media, and "Wr" is an expansion ratio based on a width of each of the plurality of other recording medium and wherein the correcting includes correcting the image data based on the calculated average of expansion ratios of the plurality of other recording media.

3. The image forming apparatus as claimed in claim 1,
wherein the image forming process executed by the CPU includes
forming an electrostatic latent image on a surface of an image carrier, and
transferring a toner image that is formed according to the electrostatic latent image on the first recording medium,
wherein the first position is a position where the electrostatic latent image is formed,
wherein the second image is a position where the toner image is transferred to the first recording medium.

4. The image forming apparatus as claimed in claim 1,
wherein the image forming process executed by the CPU includes correcting a position of the first recording medium and conveying the first recording medium in correspondence with a timing of forming the image on the first recording medium.

5. The image forming apparatus as claimed in claim 4, wherein the image forming process executed by the CPU includes measuring a length of the first recording medium in a direction orthogonal to the sheet-conveyance direction.

6. The image forming apparatus as claimed in claim 4,
wherein the image forming process executed by the CPU includes
measuring an amount in which the first recording medium is conveyed, and
calculating a conveyance distance of the first recording medium based on the amount measured by the measuring, a detection result of the detecting of the passing of the end of the first recording medium.

7. The image forming apparatus as claimed in claim 6, wherein the image forming process executed by the CPU includes calculating the conveyance distance of the first recording medium based on the amount measured by the measuring during a period between a time when the first end part of the first recording medium is detected and a time when the second end part of the first recording medium is detected.

8. The image forming apparatus as claimed in claim 1, wherein the plurality of other recording media are a predetermined number of sheets that are conveyed immediately before the first recording medium is conveyed.

9. The image forming apparatus as claimed in claim 1,
wherein the same types of detectors are used in the detecting, and
wherein the types of detectors include a thru-beam type sensor and a reflective type sensor.

10. An image forming method comprising the steps of:
forming an image on a first recording medium based on image data;
measuring a size of the first recording medium;
calculating an expansion ratio of the first recording medium based on a first size of the first recording medium obtained before the first recording medium is passed through and a second size of the first recording medium obtained after the first recording medium is passed through; and
correcting the image data that is used for forming another image on a second recording medium conveyed after the first recording medium based on the expansion ratio of the first recording medium,
wherein the measuring includes measuring a length of the first recording medium in a sheet-conveyance direction of the first recording medium,
detecting a passing of an end of the first recording medium,
wherein the calculating includes calculating the average of expansion ratios of the plurality of other recording media according to "Lram=(Lr1+Lr2+ . . . +Lrm)/m" and "Wram=(Wr1+Wr2+ . . . +Wrm)/m",
wherein "m" is the number of the plurality of other recording media, "Lr" is an expansion ratio based on a length of each of the plurality of other recording media, and "Wr" is an expansion ratio based on a width of each of the plurality of other recording media,
wherein the correcting includes correcting the image data based on the calculated average of expansion ratios of the plurality of other recording media.

11. The image forming method as claimed in claim 10,
wherein the plurality of other recording media are a predetermined number of sheets that are conveyed immediately before the first recording medium is conveyed.

12. The image forming method as claimed in claim 10,
wherein the same types of detectors are used in the detecting, and
wherein the types of detectors include a thru-beam type sensor and a reflective type sensor.

13. A non-transitory computer-readable recording medium on which a program is recorded for causing a computer to execute an image forming method, the image forming method comprising the steps of:
forming an image on a first recording medium based on image data;
measuring a size of the first recording medium;
calculating an expansion ratio of the first recording medium based on a first size of the first recording medium obtained before the first recording medium is passed through and a second size of the first recording medium obtained after the first recording medium is passed through; and
correcting the image data that is used for forming another image on a second recording medium conveyed after the first recording medium based on the expansion ratio of the first recording medium,
wherein the measuring includes measuring a length of the first recording medium in a sheet-conveyance direction of the first recording medium,
detecting a passing of an end of the first recording medium,
wherein the calculating includes calculating the average of expansion ratios of the plurality of other recording media according to "Lram=(Lr1+Lr2+ . . . +Lrm)/m" and "Wram=(Wr1+Wr2++Wrm)/m",
wherein "m" is the number of the plurality of other recording media, "Lr" is an expansion ratio based on a length of each of the plurality of other recording media, and "Wr" is an expansion ratio based on a width of each of the plurality of other recording media, and
wherein the correcting includes correcting the image data based on the calculated average of expansion ratios of the plurality of other recording media.

14. The non-transitory computer-readable recording medium as claimed in claim 13, wherein the plurality of other recording media are a predetermined number of sheets that are conveyed immediately before the first recording medium is conveyed.

15. The non-transitory computer-readable recording medium as claimed in claim 13,
the same types of detectors are used in the detecting, and
wherein the types of detectors include a thru-beam type sensor and a reflective type sensor.

* * * * *